United States Patent

Bowie

[11] 4,342,952
[45] Aug. 3, 1982

[54] SYNCHRO STABILIZER CIRCUIT

[75] Inventor: Robert A. Bowie, Glendale, Ariz.

[73] Assignee: Sperry Corporation, New York, N.Y.

[21] Appl. No.: 265,309

[22] Filed: May 20, 1981

[51] Int. Cl.³ .............................................. G05B 1/06
[52] U.S. Cl. .................................. 318/654; 318/661;
318/599; 340/347 SY
[58] Field of Search ............... 318/654, 655, 599, 661,
318/660; 340/347 SY

[56] References Cited

U.S. PATENT DOCUMENTS 3,460,130 8/1969 Lavin ................................ 318/661 X
3,671,728 6/1972 Day et al. ......................... 318/661 X
3,706,923 12/1972 Dunfield ............................... 318/661

4,084,121 4/1978 Steglich ................................ 318/654

Primary Examiner—B. Dobeck
Attorney, Agent, or Firm—Howard P. Terry

[57] ABSTRACT

A circuit for overcoming variations in the output signals from a synchro device resulting from a.c. supply voltage variations includes means to provide a pulse train in which the pulse widths are modulated in accordance with supply voltage variations. A signal derived from a pair of synchro output terminals is applied to a rectifier/filter which is intermittently actuated by the pulse width modulated signal. The resultant d.c. signal is effectively divided by a factor proportional to the supply voltage so as to be independent of variations in that voltage.

7 Claims, 10 Drawing Figures

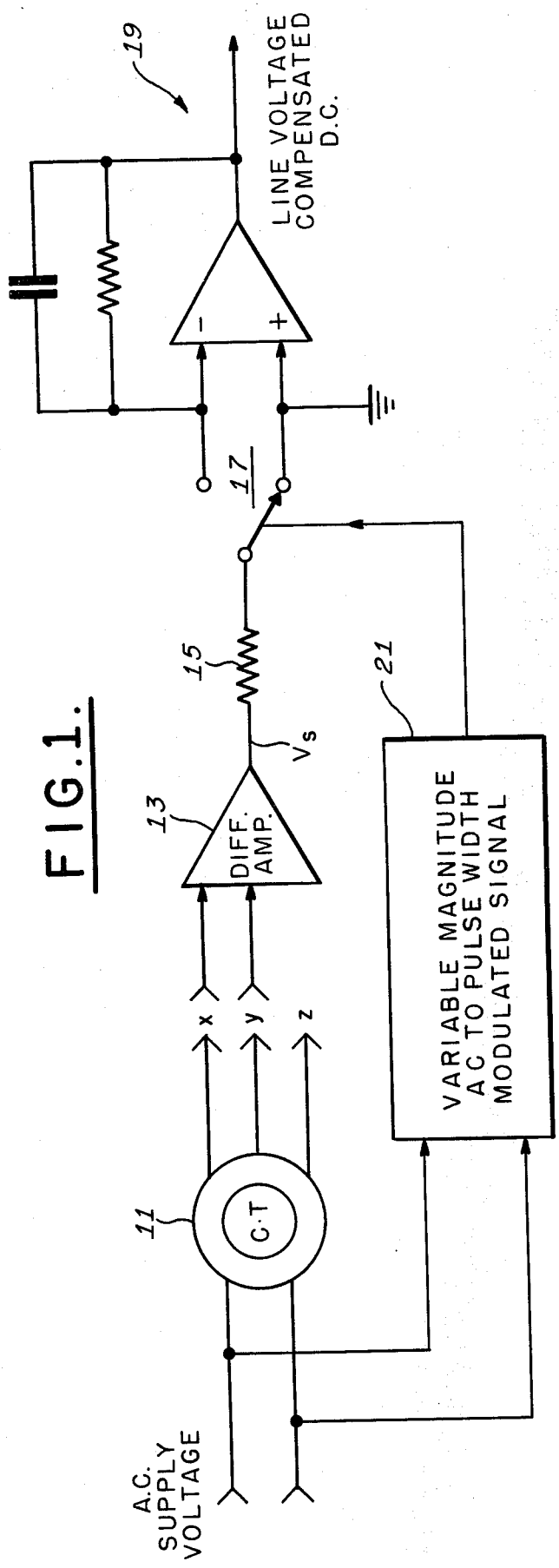
FIG.1.
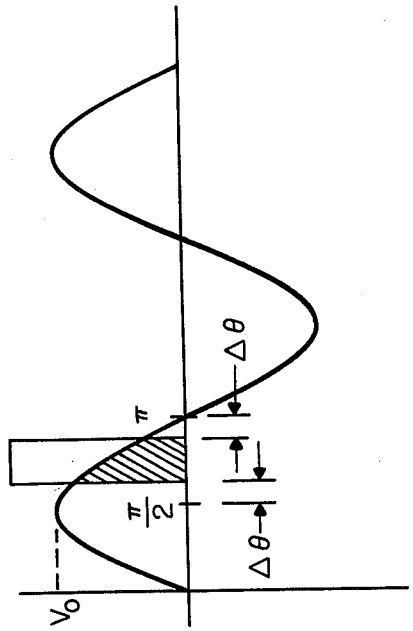

SYNCHRO STABILIZER CIRCUIT

BACKGROUND OF THE INVENTION

1. Field of the Invention

The present invention relates to synchro stabilizer circuits, and more specifically, to means for overcoming the effect of line voltage variations on synchro output signals.

2. Description of the Prior Art

The output voltages derived from synchro devices are a function not only of the variables being monitored, but also of the magnitude of the supply voltage. Thus in situations where the supply voltage cannot be precisely regulated, variations in the line voltage may seriously affect the accuracy of the entire synchro system. Present techniques for compensating for line voltage variations in synchro systems employ a separate gain programming circuit which scales the demodulated d.c. signal as a function of the magnitude of the supply voltage. However, in such systems, the phase difference between the input to the demodulator and the line voltage scaler produces d.c. signals which are essentially uncompensated at higher frequencies. The problem becomes particularly severe in aircraft applications, for instance, which normally utilize a 400 Hertz supply voltage and line voltage variations typically occur in the 1-70 Hertz frequency range. The present invention eliminates the need for separate gain scaling circuits and thereby provides considerable cost savings for systems using a single a.c. supply to demodulate several a.c. inputs. The present system also eliminates the need for precise matching of the phase shift of the demodulator and the scaler.

SUMMARY OF THE INVENTION

The effect of supply voltage variations in a synchro system is overcome by producing a pulse train in which the widths of the individual pulses are modulated in accordance with variations in the supply voltage. The pulse width modulated signal is used to sample the output of a synchro device so as to effectively divide the synchro output by a factor representative of the magnitude of the supply voltage.

BRIEF DESCRIPTION OF THE DRAWINGS

FIG. 1 is a drawing useful in explaining the general principles of the invention.

DESCRIPTION OF THE PREFERRED EMBODIMENTS

Figure 2:
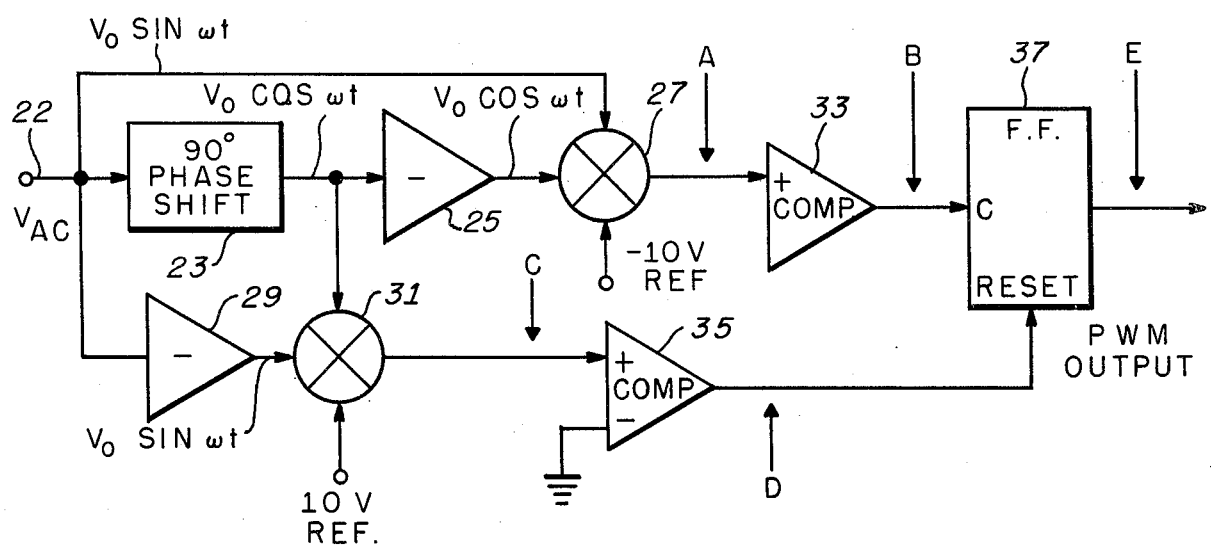
FIGS. 2 and 3 illustrate embodiments of the present invention.
Figure 2:
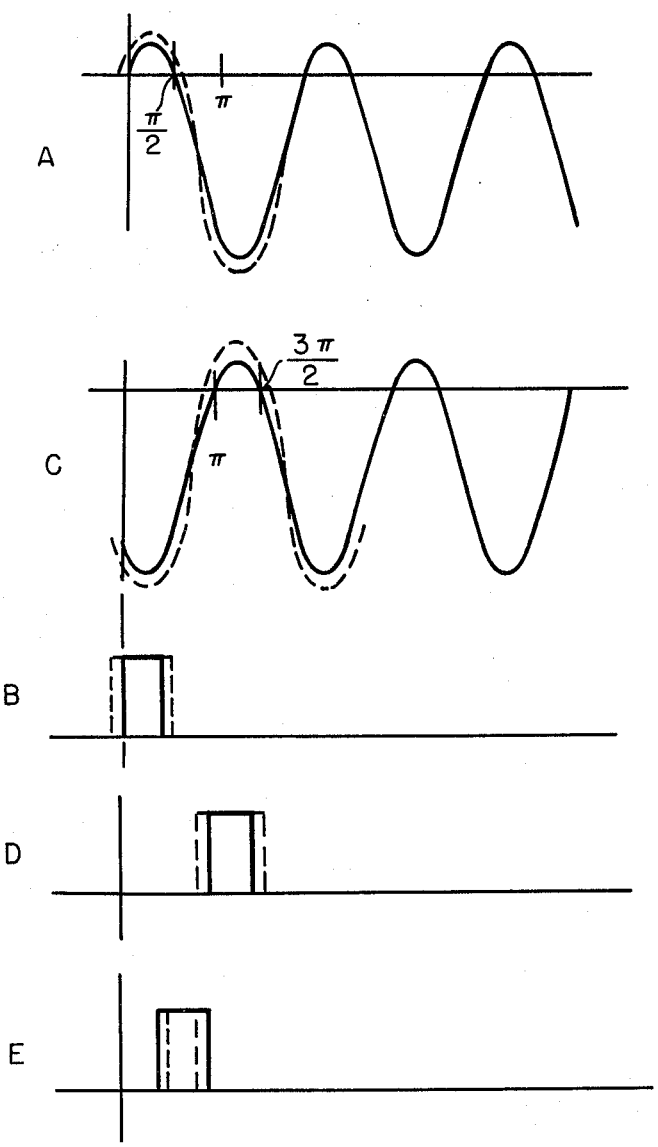

Information from two of the three output terminals of a synchro device is frequently used to control variables of interest when such variables have a limited range. In a typical aircraft automatic pilot, for instance, circuits to control the roll and pitch functions may employ a control transformer wherein the output from the X and Y terminals provides two wire information useful in providing the desired control. Such two wire information results in a signal which is proportional to the sin $\phi$ of the angle being monitored and varies in accordance with the following equation:

$$V_s = KV_o \sin \phi \cos \omega t \qquad 1.$$

where $V_s$ is the instantaneous signal voltage,
$V_o$ is the peak value of the supply voltage, and
$K$ is the transformation ratio of the synchro.

In accordance with the principles of the present invention, an analog circuit creates a pulse width modulated signal in which the width of the individual pulses is a function of the magnitude of an a.c. supply voltage. When the signal defined in equation (1) is applied to a rectifier/filter circuit during the occurrence of each width modulated pulse, the resultant d.c. signal will have been effectively divided by a factor proportional to the magnitude of the a.c. supply voltage.

Consider, for instance, the circuit depicted in FIG. 1 wherein a control transformer 11 is energized by an a.c. supply voltage and the X-Y output terminals are connected to a differential amplifier 13 so as to supply an output signal voltage from the differential amplifier in accordance with the foregoing equation (1). This signal is applied through a series resistor 15 and a chopping switch 17 to a rectifier/filter circuit 19 so as to provide a line voltage compensated d.c. output signal. The a.c. supply voltage is also applied to a pulse width modulator 21 which actuates the switch 17 as will be explained. The resistor 15, the chopping switch 17 and the rectifier/filter combination 19 constitute a demodulator so as to provide a d.c. signal having a magnitude dependent substantially only on the angle of the rotor in the control transformer 11.

Consider now the action of this demodulator on a sine wave $V_s$ when the modulator 21 produces output pulses having a width of one-quarter of that sine wave. A perfect one-quarter wave demodulation would yield a d.c. output signal having an average value of:

$$\text{d.c.} = .225 \, V_o \left( -\cos\pi - \cos\frac{\pi}{2} \right) \qquad 2.$$

$$= .225 \, V_o$$

Consider now the situation where the modulated pulse width is changed such that the leading and trailing edges of the pulse are displaced by an amount $\Delta\theta$ from the $\pi/2$ and $\pi$ points respectively, as graphically depicted in FIG. 1. Under these conditions, the resultant d.c. voltage becomes:

$$\text{d.c.} = .225 \, V_o (-\cos\pi - \Delta\theta) + \cos\left(\frac{\pi}{2} + \Delta\theta\right) \qquad 3.$$

$$= .225 \, V_o (\cos \Delta\theta - \sin \Delta\theta)$$

As graphically depicted in FIG. 1, under these conditions the area under the curve intercepted by the modulated pulse, and therefore the effective value of the d.c. output voltage is inversely related to the magnitude of $\Delta\theta$.

A modulator for converting variations in the magnitude of the a.c. supply voltage to pulse width modulated signals is depicted in FIG. 2. The sinusoidal a.c. supply voltage is applied to input terminal 22. Typically, and for purposes of illustration, this voltage is a 400 Hz signal having a nominal peak value of 10 volts. This voltage is applied to a phase shifter 23 which provides a 90° lagging phase shift.

The phase shifted signal is passed through an inverting amplifier 25 to a first summing network 27 where it is summed with the a.c. signal from the terminal 22 and with a negative d.c. reference voltage which has a value equal to the nominal peak value of the a.c. supply voltage.

The supply voltage from the terminal 22 is also passed through a second inverting amplifier 29 to a second summing circuit 31 where it is summed with the output of the phase shifter 23 and the reference voltage. The output signals from the summing networks 27 and 31 consist of a pair of out-of-phase sinusoids, each offset from zero voltage by the amount of the reference voltage as depicted in curves A and C, respectively, and wherein the solid lines depict a first value of supply voltage whereas the dashed lines depict an increased supply voltage.

The signal from the summing network 27 is applied to a comparator 33 which is referenced to ground potential so as to produce an output pulse B during the time that the signal from the summing network 27 is above ground potential. Similarly, the output signal from the summing network 31 is applied to a second comparator 35 so as to produce an output pulse D during the time that the output signal from the summing network 31 is above ground potential. When the sinusoidal curves A and C have amplitudes indicated by the solid and dashed lines, the comparator output pulses have widths indicated by the corresponding solid and dashed lines, respectively.

The pulses from the comparator 33 are applied to the clock terminal of a flip-flop 37 and the output pulses from the comparator 35 are applied to the reset terminal of the same flip-flop. Consequently, the output from the flip-flop 37 consists of a pulse width modulated signal E whose width decreases as the amplitude of the supply voltage increases.

The pulse modulated signal from the flip-flop 37 is applied to the chopping means 17 in FIG. 1. It will be understood that the chopping means in practical circuits can be any suitable switching means and would ordinarily be a conventional solid state device.

Again, assuming that the supply voltage has a nominal peak value of ten volts, and that a reference voltage of the same value is used, the pulse width will be modulated in accordance with the following equation, wherein the various parameters are those depicted graphically in FIG. 1:

$$\sin\left(\frac{\pi}{2} + \Delta\theta\right) + \cos\left(\frac{\pi}{2} + \Delta\theta\right) = \frac{10}{V_o} \quad 4.$$

from which:

$$\cos\Delta\theta - \sin\Delta\theta = \frac{10}{V_o} \quad 5.$$

It will be appreciated that this is the exact relationship which satisfies equation (3).

By using the modulated width pulses to actuate a chopping means such as 17, the effect of supply voltage variations is cancelled and the magnitude of the line voltage compensated d.c. output voltage is dependent only upon angular displacement of the rotor in the control transformer 11.

Figure 3:
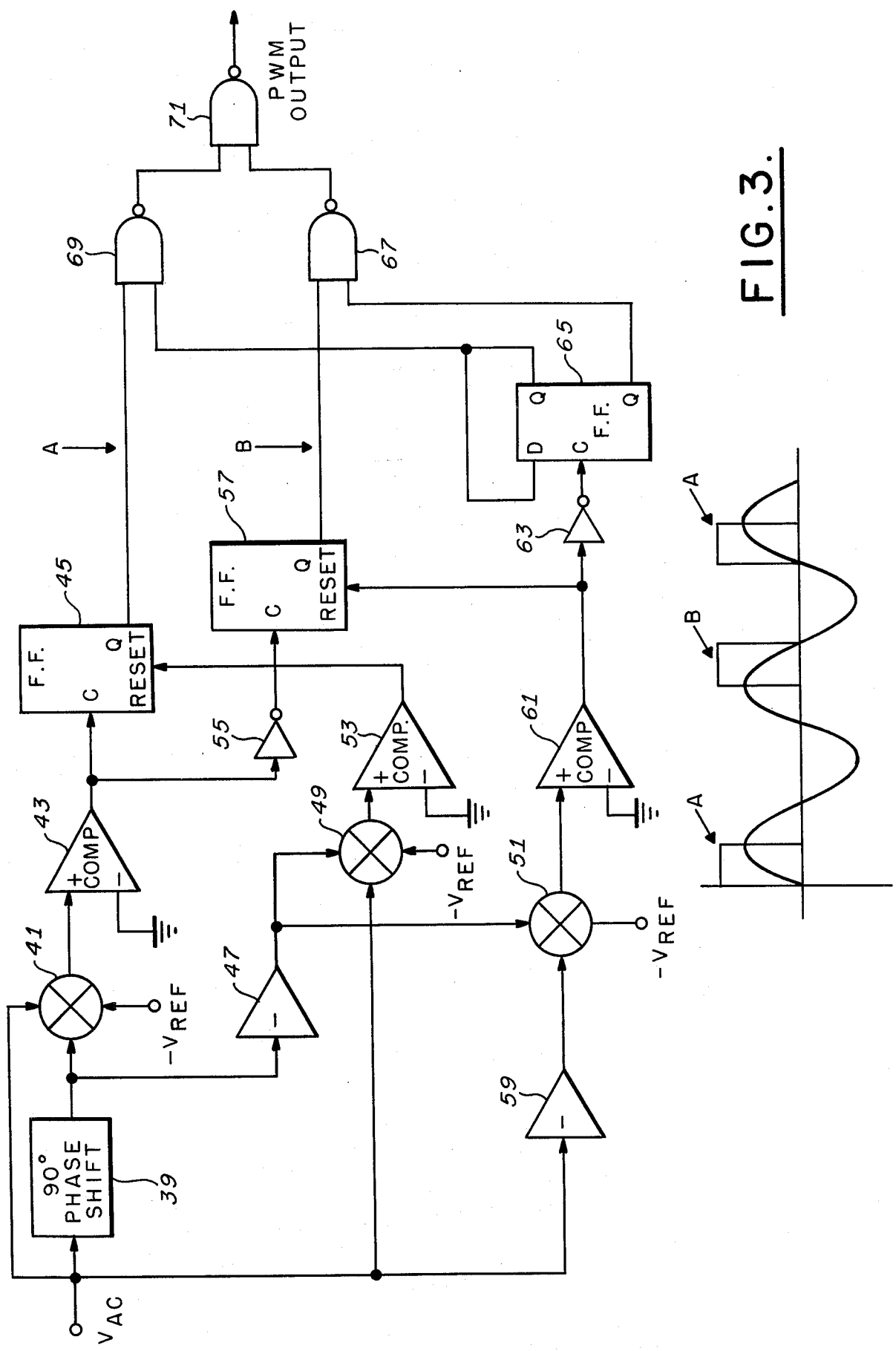

A voltage compensator capable of providing quadrature rejection is depicted in FIG. 3. The a.c. supply voltage is applied to a 90° phase shifter 39 which provides a leading phase shift signal that is combined in a summing network 41 with the supply voltage and the reference voltage. The output from the summing network 41 is applied through a comparator 43 to the clock terminal of a flip-flop 45.

The output of the phase shifter 39 is also applied through an inverting amplifier 47 to second and third summing networks 49 and 51. The inverted, phase shifted input signal and the a.c. supply voltage are combined with the reference voltage in the summing network 49 and applied through a comparator 53 to the reset terminal of the flip-flop 45. Because of the various phase relationships developed in the foregoing components, the width modulated pulse A occurs during the first quadrant of appropriate cycles of the a.c. supply voltage as depicted graphically in FIG. 3.

The output from the comparator 43 is also applied through an inverter 55 to the clock terminal of a second flip-flop 57. The supply voltage also passes through an inverting amplifier 59 to the summing network 51 where it is combined with the signal from the inverting amplifier 47 and the reference voltage and applied to a comparator 61. The output of the comparator 61 is used to reset the second flip-flop 57. Because of the phase relationships produced in these components, a width modulated pulse B is derived from the flip-flop 57 which occurs during the second quadrant of appropriate cycles of the a.c. supply voltage as depicted graphically in FIG. 3.

The output of the comparator 61 is also applied through an inverter 63 to the clock terminal of a D flip-flop 65. The Q output terminal of the flip-flop 65 is applied to a first inverting AND gate 67. The $\overline{Q}$ output terminal of the fli-flop 65 is connected to the D input terminal and to a second inverting AND gate 69. The output signals from the gates 67 and 69 are applied to third inverting AND gate 71.

As known in the art, a D type flip-flop connected as shown acts as a toggle in that successive clock pulses switch the flip-flop to alternate states and thus apply high voltages alternately to the gates 67 and 69. The three inverting AND gates 67, 69, and 71 cooperate to produce a train of pulse width modulated signals composed of alternate A and B signals. Thus the circuit of FIG. 3 when included in the general system depicted in FIG. 1, serves to sample alternately the first and second quadrants of successive cycles of the signals derived from the differencial amplifier 13.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A line voltage compensator for a synchro device comprising a pulse width modulator connected to the a.c. supply voltage used to energize the synchro device, means to produce a sinusoidal two wire information signal representative of the electrical output of the synchro device, rectifier/filter means and switching means to apply the two wire information signal to the rectifier/filter during the occurrence of a pulse from said modulator, said modulator including means for producing a pair of sinusoidal voltages having magnitudes proportional to the magnitude of a supply voltage and shifted in phase by a predetermined amount with respect to each other and with respect to said supply voltage, a source of d.c. threshold voltage having a magnitude representative of the nominal peak value of the a.c. supply voltage, means responsive to each of said sinusoidal voltages for providing a comparator signal when and only when the magnitude of the respective sinusoidal voltage exceeds said threshold, means responsive to first and second comparator signals representing a pair of sinusoidal voltages for producing a width modulated signal during the interval between the termination of the first comparator signal and the inception of the second comparator signal, and means to apply said width modulated signal to said switching means.

2. The voltage compensator of claim 1 wherein the first of a pair of sinusoidal voltages is displaced 45° with respect to the a.c. supply voltage and 180° with respect to the second of said pair of sinusoidal voltages.

3. The voltage compensator of claim 3 wherein the modulator contains means for producing a second pair of sinusoidal voltages displaced 90° from said first pair, said second pair of sinusoidal voltages being used to produce second width modulated signals, said modulator further including means for alternately applying the first and second width modulated signals to said switch means.

4. A line voltage compensator for a synchro device comprising a pulse width modulator connected to the supply voltage used to energize the synchro device, means to produce a sinusoidal two wire information signal representative of the electrical output of the synchro device, rectifier/filter means and switching means for applying said two wire signal to the rectifier/filter means only during the occurrence of a pulse width modulated output signal from said modulator, said pulse width modulator including means to convert said two wire signal into a pair of out-of-phase sinusoidal signals having a specified amplitude and phase relationship with respect to said two wire signal, a source of d.c. reference voltage having a magnitude representative of the nominal peak value of the supply voltage, means to offset each of the out-of-phase sinusoidal signals by an amount equal to said reference voltage, first and second comparator means referenced to ground potential and arranged to provide first and second comparator output signals whenever the corresponding offset sinusoidal signal is above ground potential, and flip-flop means arranged to be switched to the set state in response to the termination of a first comparator output signal and reset in response to the inception of the following second comparator signal so that a pulse width modulated output signal is produced during the time that the flip-flop is in the set state.

5. The voltage compensator of claim 4 wherein the means to convert the two wire signal into a pair of sinusoidal signals includes a quadrature phase shifter connected to receive the supply voltage, means to invert the output of said phase shifter, first summing means to combine the inverted phase shifted signal with the supply voltage so as to produce the first of said pair of sinusoidal signals, said means for converting the two wire signal further including means for inverting the supply voltage, and second summing means for combining the inverted supply voltage with the output of said phase shifter so as to produce the second of said pair of sinusoidal signals.

6. The voltage compensator of claim 5 wherein the means to offset the sinusoidal signals include means to apply the d.c. reference voltage to each of said summing means.

7. A line voltage compensator for a synchro device comprising a pulse width modulator connected to the supply voltage used to energize the synchro device, a differential amplifier connected to two adjacent synchro output terminals and a rectifier/filter coupled to receive the output of said amplifier through an electrically actuated switching means, said modulating means including a source of d.c. reference voltage having a magnitude equal to the nominal peak value of the supply voltage, means for converting the supply voltage into first and second sinusoidal voltages in phase opposition with each other and having a known phase relationship with said supply voltage, said converting means further including summing means connected to said source of reference voltage whereby each of said sinusoidal voltages is offset from zero potential by an amount equal to the reference voltage, comparator means to produce first and second comparator output voltages whenever the respective offset sinusoidal voltage rises above ground potential, flip-flop means arranged to be switched to the set condition in response to the termination of an output voltage from said first comparator and to be reset in response to the inception of an output voltage from said second comparator, means to actuate said switching means in response to the output of said flip-flop and thereby couple the output of said differential amplifier to said rectifier/filter when and only when the flip-flop is in the set state.

* * * * *